Sept. 1, 1953 J. J. KALMON 2,650,424
BUTCHER KNIFE HAVING A REMOVABLE GUARD
Filed June 14, 1951
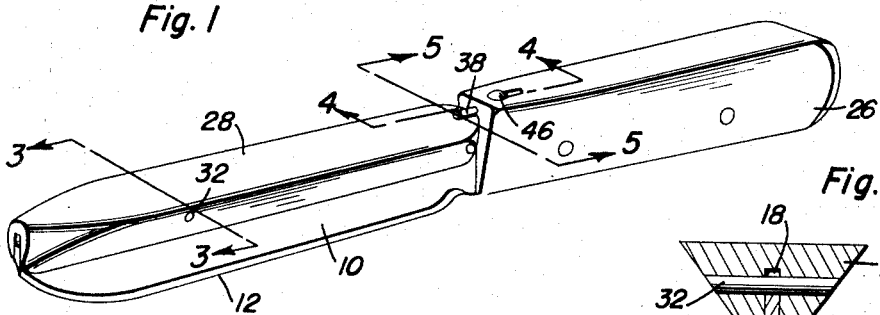
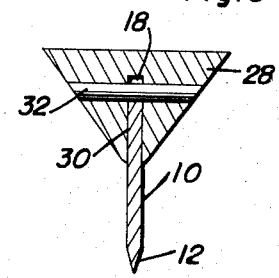
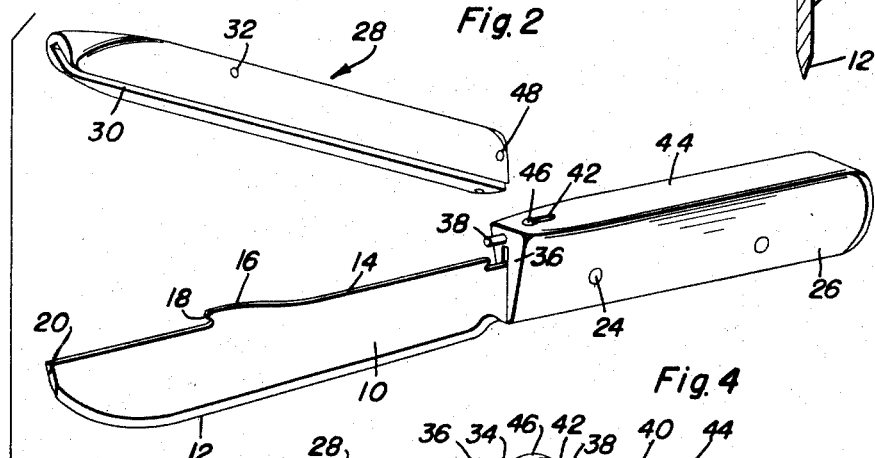
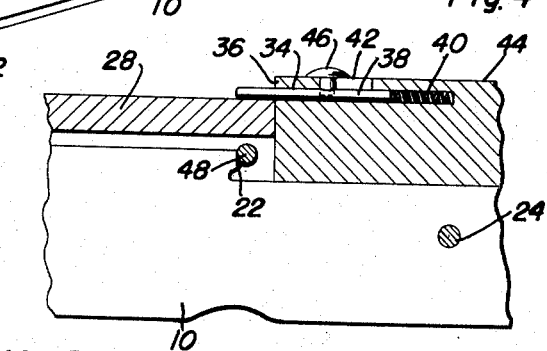
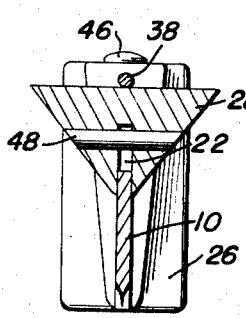
Joseph J. Kalmon
INVENTOR.

Patented Sept. 1, 1953

2,650,424

UNITED STATES PATENT OFFICE 2,650,424

BUTCHER KNIFE HAVING A REMOVABLE GUARD

Joseph J. Kalmon, Medford, Wis.

Application June 14, 1951, Serial No. 231,524

1 Claim. (Cl. 30—286)

This invention relates to a knife especially designed for skinning animals, taking fat off pigs, and the scaling of fish.

An object of this invention is to provide a knife with a removable guard which prevents the knife from cutting the hide or meat of an animal during the skinning process. The guard serves to retain the knife blade at a particular angle and thus, during the skinning or larding of a hog, little or no injury will occur to the hide or meat and the entire skinning and larding process will be effectively shortened.

Another object of this invention is to provide a knife and guard of the character described which includes a novel means for removably retaining the guard in proper position upon the knife blade.

These, together with various ancillary objects and features of the invention which will later become apparent as the following description proceeds, are attained by the device, a preferred embodiment of which has been illustrated, by way of example only, in the accompanying drawings, wherein:

Figure 1 is a perspective view of the device;

Figure 2 is a group perspective view showing the guard removed from the knife;

Figure 3 is a sectional view taken substantially on the plane of section line 3—3 of Figure 1;

Figure 4 is an enlarged sectional view taken substantially on the plane of section line 4—4 of Figure 1; and Figure 5 is a sectional view taken substantially on the plane of section line 5—5 of Figure 1.

Specific reference is now made to the drawings. In the several views in the accompanying drawings and in the following specification reference characters indicate corresponding elements throughout.

The device comprises an elongated substantially flat blade 10 having a lower beveled cutting edge 12 and an upper edge 14 which is provided intermediate its ends with an upstanding lug 16 having a hook portion 18 opening toward the front end 20 of the blade. The upper edge 14 of the blade adjacent its rear end is provided with a recess 22 and secured to the rear portion of the blade by any suitable means, as by rivets 24, is a suitable handle 26.

A guard 28 is provided which may be of any desired shape, but preferably triangular in cross section so that when the guard is assembled upon the upper edge 14 of the blade it will have portions which extend laterally of the blade and serve to limit the extent of insertion of the blade in an animal's hide and will also serve to determine the angle of insertion. Extending through one longitudinal edge or longitudinal apex of the guard is an elongated slot 30 disposed longitudinally relative to the guard and which receives the upper edge 14 of the blade. Extending transversely through the guard and through the slot 30 thereof is a first pin 32 which is adapted to engage the hook 18 of the upstanding lug 16 on the blade. This will hold the guard to a certain extent on the blade and will also prevent movement rearwardly of the guard relative to the blade.

However, to releasably retain the guard in proper locked position on the blade, a further means is provided. This means comprises an elongated longitudinally extending bore 34 in the handle which extends through the forward edge 36 thereof. As shown clearly in the drawings, the bore is located a slight distance above the upper edge 14 of the blade. Mounted slidably in the bore is a bolt 38. A coil spring 40 is positioned in the bore behind the rear end of the bolt 38 and urges the bolt outwardly as shown clearly in Figure 4. A longitudinal slot 42 in communication with the bore 34 is provided through the superior side 44 of the handle and extending through the slot and carried by the pin 38 is an upstanding finger-piece 46 to allow manual sliding of the bolt 38 inwardly against the action of the spring 40. A second pin 48 is provided which extends transversely through the guard 28 adjacent its rear end and which is adapted to engage the recessed portion 22 of the upper edge portion of the blade to prevent forward movement of the guard relative to the blade.

In use, the guard is assembled on the rear edge of the blade so that the first transverse pin 32 is made to engage the hook 18 and the second transverse pin 48 is made to engage the recessed portion 22 of the blade. During this mounting of the guard on the blade, the finger piece 46 has been moved toward the rear end of the handle. When the finger piece is released, the bolt 38 moves forwardly and overlies and rests upon an adjacent portion of the superior side of the guard to prevent upward movement of the guard. Thus the guard is releasably retained in proper position on the blade. It will be understood that a removable bolt may be used in place of the spring-urged bolt 38.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

A skinning knife comprising a handle, a knife blade secured fixedly to and projecting from the forward end of said handle, the lower lengthwise edge of said blade being sharpened and providing a cutting edge, the upper edge of said blade lying in a plane below the plane of the upper side of said handle, said upper edge having a recess situated in close proximity to the forward end of said handle, said recess opening through said upper edge and providing a keeper seat, a spring-projected manually-retracted latch-bolt slidably mounted in the upper portion of said handle, said latch-bolt being in a plane above and paralleling said upper edge, projecting through and beyond said forward end and being spaced above and overhanging said keeper seat, said upper edge having an integral lug rising therefrom at a point spaced rearwardly from the forward end of said blade, said lug being hook-shaped and the beak of the hook thus provided being directed toward the forward end of said blade, and a readily attachable and detachable guard coextensive in length with the length of said blade, said guard constituting a depth gage and stop, being triangular in cross-section and having a longitudinal slot opening through forward and rearward ends and also through the apical edge, the upper half-portion and upper edge of said blade being lodged in said slot, the rearward end of said guard directly abutting the forward end of said handle and having a transverse cross-pin situated in said recess, a second pin carried by said guard, spanning said slot and releasably engaging said hook-shaped lug, the projecting end of said latch-bolt overlying the top side of said guard and retaining said first named cross-pin in said recess, the lengthwise sides of said guard converging toward the cooperating corresponding sides of said blade and the lower half-portion and cutting edge of said blade protruding beyond said slotted apical edge, whereby said cutting edge is unobstructedly and constantly visible during the cutting and skinning steps.

JOSEPH J. KALMON.

References Cited in the file of this patent

UNITED STATES PATENTS

| Number | Name | Date |
|---|---|---|
| 525,737 | Foster | Sept. 11, 1894 |
| 1,216,381 | Watson | Feb. 20, 1917 |
| 1,638,883 | Schulz | Aug. 16, 1927 |
| 2,098,139 | Foley | Nov. 2, 1937 |
| 2,466,898 | Johnson | Apr. 12, 1949 |